United States Patent [19]
Sopko et al.

[11] Patent Number: 4,812,544
[45] Date of Patent: Mar. 14, 1989

[54] METHOD OF PRODUCING POLYMERS OF AMIDO-SULFONIC ACID MONOMERS WITH HIGH ENERGY AGITATORS

[75] Inventors: Thomas M. Sopko, Painesville; Richard E. Lorentz, Euclid, both of Ohio

[73] Assignee: The Lubrizol Corporation, Wickliffe, Ohio

[21] Appl. No.: 774,269

[22] Filed: Sep. 10, 1985

[51] Int. Cl.$^4$ .......................... C08F 2/00; C08F 28/02
[52] U.S. Cl. ................................ 526/73; 264/331.11; 526/88; 526/287
[58] Field of Search .................... 526/73, 88

[56] References Cited

U.S. PATENT DOCUMENTS

| | | | |
|---|---|---|---|
| 3,332,904 | 7/1967 | LaCombe . | |
| 3,478,091 | 11/1969 | Murfin et al. | 260/513 |
| 3,503,941 | 3/1970 | Fleetwood | 260/80 |
| 3,547,899 | 12/1970 | Arlt | 526/287 |
| 3,663,518 | 5/1972 | Patzelt et al. | 260/80.3 N |
| 3,666,810 | 5/1972 | Hope | 260/561 |
| 3,732,193 | 5/1973 | Svarz | 260/79.3 MU |
| 4,032,701 | 6/1977 | Hughes | 526/88 |
| 4,034,001 | 7/1977 | Miller et al. | 260/513 N |
| 4,138,539 | 2/1979 | Landolt et al. | 526/93 |
| 4,208,329 | 6/1980 | Smiley | 548/239 |
| 4,283,517 | 8/1981 | Perricone | 526/229 |
| 4,293,427 | 10/1981 | Lucas et al. | 252/8.5 C |
| 4,309,329 | 1/1982 | Lucas et al. | 260/29.6 TA |
| 4,404,111 | 9/1983 | Bi et al. | 252/8.55 D |

FOREIGN PATENT DOCUMENTS 777306 9/1955 United Kingdom .

OTHER PUBLICATIONS

Matsuda, "Acrylamide Production Simplified", May 19, 1977, Chemtech, pp. 306–308.
Polh et al, "Adiabatic Polymerization of Acrylamide Using a Persulfate-Bisulfite Redox Couple", Journal of applied Polymer Science, vol. 26, 611–618 (1980).

Primary Examiner—Christopher Henderson
Attorney, Agent, or Firm—William C. Tritt; Karl Bozicevic; Robert A. Franks

[57] ABSTRACT

A method for producing homopolymers and copolymers from amido-sulfonic acid or salt containing monomers in the presence of high energy mechanical mixing utilizing a final stage polymerization temperature of from about 200° F. to below the degradation temperature of the monomer. The process produces a solid homopolymer or copolymer which can be utilized as fluid loss agents.

31 Claims, No Drawings

METHOD OF PRODUCING POLYMERS OF AMIDO-SULFONIC ACID MONOMERS WITH HIGH ENERGY AGITATORS

BACKGROUND OF THE INVENTION

The present invention relates to a method of utilizing high energy mechanical mixing to produce homopolymers and copolymers made from amido-sulfonic acid monomers or salts thereof. More specifically, the present invention relates to producing such polymers by utilizing a high final stage polymerization temperature as well as drying the polymer before any substantial cooling thereof.

PRIOR ART

U.S. Pat. No. 3,663,518 to Patzelt et al relates to a process for preparing acrylamide polymers by forming a solution of at least one monomer and a catalyst, preparing a thin film therefrom, heating said formed thin film to a temperature sufficient to initiate polymerization and initiating such polymerization and maintaining the polymerization temperature until the polymerization is essentially complete.

U.S. Pat. No. 3,732,193 to Svarz relates to a continuous polymerization process in which an aqueous solution of a water soluble unsaturated monomer is polymerized on a heated continuously moving belt to produce a dry thin film. The polymer is usually polyacrylamide.

U.S. Pat. No. 3,478,091 to Murfin et al relates to the preparation of 2-amido-2-alkenesulfonates by reacting a ketone having at least one hydrogen atom in each alpha position with a nitrile and a sulfuric acid.

U.S. Pat. No. 3,503,941 to Fleetwood relates to the production of dry acrylic polymers produced by polymerizing an aqueous solution of acrylic acid in a pressurized, heated reaction zone and subsequently extruding the polymer to yield a fibrous brittle ribbon.

U.S. Pat. No. 3,666,810 to Hoke relates to the preparation of N-3-aminoalkyl propionamides and to polymers thereof by reaction analogous N-3-oxohydrocarbon-substituted amides with an amine in the presence of a reducing agent.

U.S. Pat. No. 4,034,001 to Miller relates to the preparation of bis-amidoalkanesulfonic acids and salts thereof.

U.S. Pat. No. 4,138,539 to Landolt relates to a multistep process for preparing a high molecular weight water soluble synthetic polymer in the form of a readily dissolved powder wherein water soluble ethylenically unsaturated monomers and an aqueous redox initiator system are utilized.

U.S. Pat. No. 4,208,329 to Smiley relates to the purification of acrylonitrile monomer by the removal of oxazole therefrom.

U.S. Pat. No. 4,283,517 to Perricone et al relates to a continuous process for solution polymerization of acrylamide by rapidly heating a single phase high solids aqueous solution of the monomers to polymerization initiation temperature immediately prior to depositing a uniform layer thereof, as well as a solution of a polymerization initiator, onto a moving surface wherein the surface of the reaction mixture is heated only if necessary to maintain the temperature of the polymerization from dropping substantially below the polymerization initiation temperature.

U.S. Pat. No. 4,293,427 to Lucas et al relates to utilizing a copolymer of an acrylamido alkyl sulfonic acid or alkali metal salt thereof and an acrylamide or N-alkyl acrylamide as an aqueous drilling fluid composition.

U.S. Pat. No. 4,309,329 to Lucas et al relates to a terpolymer consisting essentially of an alkali metal acrylate units, hydroxyalkyl acrylate units and acrylamide as a filtration control agent in an aqueous drilling fluid.

U.S. Pat. No. 4,404,111 to Bi et al relates to an N,N-dimethylacrylamide/2-acrylamido-2-methyl-propane sulfonic acid copolymer.

U.S. Pat. No. 4,032,701 to Hughes relates to a continuous method for producing a dry, solid polyacrylamide by polymerization on a hot rotating disc.

British Patent No. 777,306 relates to a method of polymerizing acrylic acid salts by spraying an aqueous solution of one or more monomers thereof in the presence of an alkali metal or ammonium persulfate onto a heated gaseous medium.

An article relating to "Acrylamide Production Simplified" by Matsuda, Chemtech, May 19, 1977 pages 306–308 sets forth a catalytic hydration method for converting nitriles to amides.

An article relating to "Adiabatic Polymerization of Acrylamide Using a Persulfate-Bisulfite Redox Couple" by Polh et al, Journal of Applied Polymer Science, Vol 26, pages 611–618 (1980) sets forth the results of an investigation as to reaction rates under various conditions to establish the dependence of rate on monomer as well as initiator concentration.

SUMMARY OF THE INVENTION

Accordingly, it is an aspect of the present invention to provide a method for producing a homopolymer from amido-sulfonic acid or salt containing monomers. Similarly, another aspect relates to a method for producing copolymers from amido-sulfonic acid or salt containing monomers as well as vinyl comonomers containing a nitrogen and/or oxygen group therein. Solid polymers containing relatively low amounts of water therein are produced desirably via an aqueous solution in the presence of high energy mechanical mixing which polymers are desirably subjected to drying before any substantial cooling thereof.

PREFERRED EMBODIMENTS

The amido-sulfonic acid or salt containing monomers according to the present invention can be generally represented by the following formula:

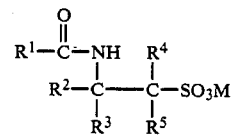

wherein $R^1$ is a hydrocarbyl group having from 1 to 11 carbon atoms. More specifically, $R^1$ is an aliphatic or an olefinic group having from 1 to about 4 carbon atoms with a vinyl group being preferred. $R^2$, $R^3$, $R^4$, and $R^5$, independently, can be hydrogen or a hydrocarbyl with the proviso that the total number of carbon atoms is 8 or less. Desirably, $R^2$ and $R^3$, are hydrogen or a lower alkyl having from 1 to 8 carbon atoms. Preferably, $R^2$ and $R^3$ are methyl. Desirably $R^4$ and $R^5$, independently, are hydrogen or an alkyl having from 1 to 8 carbon atoms with hydrogen being preferred. M is H, an ammonium cation, a metal cation, or mixtures thereof. The metal cation can generally be any metal cation and desirably potassium, magnesium, calcium, lithium, iron, zinc, sodium and the like. Sodium and potassium are especially preferred. Typically, the monomers are utilized in the form of a salt. A highly desirable monomer for making either a homopolymer or a copolymer is 2-acrylamido-2-methylpropanesulfonic acid or a salt thereof.

The storage of the amido-sulfonic acid or salt containing monomer as well as polymerization thereof generally occurs in the presence of a solvent. Water is the preferred solvent for the preparation of both homopolymers and copolymers of the amido-sulfonic acid or salt containing monomers because of the limited solubility of the monomers in most organic solvents. Other suitable but less desirable solvents include dimethylformamide, methanol, dimethylsulfoxide, and other polar solvents. The amount of the amido-sulfonic acid or salt containing monomer, or combinations of the various such different monomers in the solvent generally ranges from about 15% to about 100% by weight based upon the weight of the monomer and solvent. Generally, an amount is utilized which is less than the saturation weight amount of the monomer in the solvent. With regard to an aqueous solution, the amount of monomer is generally from about 40 to 70% by weight, desirably from about 4% to about the saturation point of the aqueous solution, preferably from about 50% to about the saturation point of the aqueous solution, more preferably from about 50% to about 60% and highly preferable from about 55% to about 60% by weight based upon the weight of said monomer and said aqueous solution. Such high amounts by weight of the monomer are desirable in that the, polymerization thereof results in higher yields, higher molecular weight, better performance properties and is easier to handle.

According to the present invention, a wide variety of copolymers can be prepared utilizing suitable comonomers. Generally, the comonomer is such that the overall copolymer is soluble in the solvent and preferably soluble in water. Oftentimes, the comonomer itself is water soluble. The various comonomers generally contain a vinyl group as well as a nitrogen and/or an oxygen molecule therein. Thus, various acrylamides, various vinyl pyrrolidones, various vinyl caprolactams, various acrylates, various acrylonitriles, various maleic acids and maleic anhydrides, as well as various acrylic acids can be utilized. By the term "various" it is meant the different compounds, derivatives or salts thereof known to the art and to the literature. Considering the acrylamides, specific examples of monomers include methacrylamide, N,N-dimethylacrylamide, diacetoneacrylamide dimethylaminopropylmethacrylamide, t-butylacrylamide, acrylamide, and the like. Examples of suitable pyrrolidones include N-vinylpyrrolidone and the like. Various caprolactams include N-vinylcaprolactam and the like. Suitable acrylates include t-butylacrylate, methylacrylate, dihydrodicyclopentadienyl acrylate, 4-butane diol monoacrylate, diethylaminoethylacrylate, methylmethacrylate, and the like. Examples of various acrylonitriles include acrylonitrile, chloroacrylonitrile, methacrylonitrile, and the like. Besides maleic anhydride or acid, various derivatives and salts thereof can be utilized. In addition to acrylic acid, various derivatives thereof can be utilized such as methacrylic acid, and the salts of these acids. Preferred comonomers of the present invention include N-vinylpyrrolidone, N,N-dimethylacrylamide, diacetoneacrylamide, acrylamide, N-vinylcaprolactam, and t-butylacrylamide with N,N-dimethylacrylamide being highly preferred.

Desirably, the comonomers have good solubility in the solvent. Should the comonomer not have good solubility, it is then desirable to utilize a small portion of another solvent such as an alcohol, for example methanol, to render the comonomer soluble in the solvent such as water. The amount of comonomer utilized will generally vary depending upon the type of comonomer utilized as well as the type of copolymer desired. Generally, it will vary from about 0.1% to about 30% by weight, desirably from about 1% to about 15% and preferably from about 3% to about 8% by weight based upon the total weight of all of the monomers.

An important aspect of the present invention is the use of high energy mechanical mixing the polymerizing monomers regardless of whether a homopolymer or a copolymer is being made. In other words good mixing is desired. Various types of high energy mechanical mixing devices include a two roll mill, an extruder, a continuous mixer and the like. It is also contemplated that static mixers can also be utilized wherein high energy is imparted by a pump. Inasmuch as the polymerization mixture tends to be viscous and/or tacky, equipment which tends to be self-wiping is desired. Extruders are preferred since the comonomers and other additives can be fed to the feed hopper with a polymerized product being produced in a suitable strand, ribbon, or the like. A twin screw extruder is highly desirable in that it is self-cleaning, that is wipes itself free of any residual or viscous polymer.

During polymerization, the various monomers or comonomers are heated to a suitable polymerization temperature. Heating is generally gradual throughout the heating cycle regardless of the type of high energy mechanical mixing device utilized be it a two roll mill, an extruder, or the like. Should an extruder be utilized, the screw configuration is not important and thus generally any type of screw configuration can be utilized. Inasmuch as the polymerization reaction is exothermic, the reaction itself will contribute to the temperature increase. The rate of temperature increase is generally not critical and the various monomers and additives can be initially added at ambient temperature. Heat is gradually applied until a polymerization temperature is reached. In an extruder, various zones can be heated to produce a suitable polymerization reaction temperature as well as a final polymerization reaction temperature. For example, if a three heating zone extruder is utilized, the first zone can be heated to a temperature of approximately 90° to 180° F., the second zone, a temperature of about 150° to about 240° F. with the third zone being heated to a temperature of from about 200° to approximately 300° F. It is to be understood however that many other types of heating zones or arrangements via an extrusion reaction can be utilized.

According to the present invention, it is an important aspect to utilize a high final stage polymerization temperature to facilitate drying of the polymer. Otherwise, it has been found that subsequent drying is difficult and the production of a suitable homopolymer or copolymer is reduced. That a high final stage polymerization temperature could be utilized was unexpected since it was thought that the molecular weight would be impaired or decreased. A desirable final polymerization temperature of a homopolymer or copolymer according to the present invention is from about 200° F. to slightly below the degradation temperature of the lowest degrading monomer, desirably from about 220° F. to just below said degradation temperature, preferably from about 230° F. to about 300° F. with a highly preferred temperature being from about 240° F. to about 280° F. By the term "slightly below the degradation temperature", it is meant from about 1° F. to about 20° F. of below said degradation temperature. By the "final polymerization temperature" it is meant the temperature at the end of the high energy mechanical mixing device which oftentimes is the exit temperature.

According to the present invention, a solid homo- or copolymer is produced. In addition to conducting the final or terminal polymerization step at a high temperature, it is important that the homo- or copolymer be substantially dried before any substantial reduction in temperature of the homo- or copolymer occurs. That is, the temperature of the homo- or copolymer should not be reduced to ambient and preferably is maintained at a temperature of at least 200° F. and more preferably at least 240° F. before it is subjected to drying. Although the homo- or copolymer can be maintained or stored at an elevated temperature, it is often desirable after polymerization to immediately commence drying thereof. Any conventional or common mode of drying can be utilized such as irradiation, for example, infrared, convection heat, and the like. Regardless of the high energy mechanical device utilized, in polymerizing the monomers, the homo- or copolymer is transferred to a suitable vessel to be dried. A desirable mode of drying is the transfer of the polymer as from an extruder, to a moving conveyor belt where, because of economic reasons, infrared heat can be utilized to remove the solvent. The drying temperature at standard conditions is from at least the boiling point of the solvent utilized to approximately 600° F. In the preferred embodiment wherein water is utilized, the drying temperature is from about 212° F. to about 600° F., desirably from about 350° F. to about 550° F., and preferably from about 400° F. to about 500° F. Drying can also be achieved by applying a vacuum, without heat or with heat at temperatures of from ambient to those set forth above. Drying is continued until most of the solvent is removed. Desirably, the amount of solvent such as water remaining in the solid polymer is 20% or less, more desirably 10% or less and preferably 3% by weight or less. A dried product is very desirable because of commercial reasons such as ease of size reduction, ease of handling, inventory advantages and the like.

Generally, the polymerization is carried out in a basic medium wherein various polymerization aids can be utilized. Although initiators are often utilized, polymerization may be conducted without initiators as in the presence of an inert atmosphere, for example nitrogen. Moreover, polymerization can be carried out in an acidic medium and even without heat although heat is desirable. Generally, initiators are utilized in the aqueous system such as peroxides, persulfates, persulfate-sulfites, various redox systems and the like. Such initiators are well known to the art and to the literature. A preferred initiator is ammonium persulfate.

Another aspect of the present invention relates to utilizing a co-catalyst which is added only initially to the polymerization reaction and not throughout the entire reaction. Such initiators are generally well known to the art as well as to the literature. An example of such a preferred initiator is sodium meta-bisulfite. Inasmuch as such initiators tend to adversely affect the molecular weight of the polymer, they are not utilized in high amounts whenever high molecular weights are desired. The total amount of the initiator is generally from 0 to about 5 parts by weight per 100 parts by weight of monomer, desirably from about 0.05 to 0.5 parts and preferably from about 0.2 to about 0.3 parts by weight. As noted, the co-catalyst is only added at the onset of a polymerization process.

Generally, the approximate weight average molecular weight of the homopolymer or copolymer made according to the present invention will range from about 100,000 to about 9,000,000, desirably from about 500,000 to 6,000,000, and preferably from about 1,000,000 to about 3,000,000. Naturally, the molecular weight can be varied depending upon desired end product usage such as those set forth herein below. Once the homopolymer or copolymer has been produced and dried, it can be ground into a powder by any conventional grinding apparatus.

Polymers and copolymers produced according to the present invention are useful in many applications. For example, they can be utilized as dispersants in water to remove, inhibit, or control rust, scale or alluvian deposits, as polymeric surfactants in paints, as polymeric scintillators, as polymers for the construction of contact lenses, in cosmetics, as anti-fog optical coatings, as fluid thickeners in aqueous hydraulic fluids, and the like. Another desirable use is as a fluid loss agent utilized in oil wells to make an impermeable layer to seal the wall of a drill hole.

The invention will be better understood by reference to the following examples.

EXAMPLE 1

A monomer blend consisting of 3.0% weight N,N-dimethylacrylamide, 56.3% (wt) sodium 2-acrylamido-2-methylpropanesulfonate, and 40.7% (wt) water having a pH of 9.0–9.5 is fed to a 4-inch Baker Perkins twin-screw extruder at 70 lb/hr. Just prior to entering the extruder, the monomer feed is heated to 100–110° F. An initiator solution consisting of 8.4% (wt) ammonium persulfate and 91.6% (wt) water is fed to the extruder at 1.3 lb/hr. Both the monomer solution and the initiator solution are fed to the front of the extruder. At startup, about 1.3 lbs/hour of a solution of 7.1% wt of sodium meta-bisulfite is added and gradually reduced to zero over a period of 30 minutes. The material temperature is monitored at 3 different locations in the extruder and at the extruder die. The material temperatures in the first third, second third, and final third of the extruder are 155°–165° F., 210°–220°° F., and 225°–235° F. The material temperature at the extruder die is 255°–265° F. Tempered water is fed to jackets on the extruder to maintain these temperatures. The residence time in the extruder is 3–5 minutes. The resulting polymer is extruded in the form of ⅜-inch diameter strands onto the belt of an infrared conveyor dryer. The polymer moves through the dryer at a rate of 1.75–1.85 feet/minute. In the dryer, the polymer is dried to a water content of 1–2% (wt). The polymer reaches a temperature of 450°–500° F. in the dryer. The residence time in the dryer is 8–12 minutes. At the end of the dryer, the polymer falls into a crusher where it is crushed to a suitable size. The copolymer produced is the desired product.

EXAMPLE 2

The procedure from Example 1 is repeated, except that the 8.4% initiator solution is fed to the extruder at a rate of 1.75 lb/hr. The material temperatures in the extruder and dryer remain as they are in Example 1. The copolymer produced is the desired product.

EXAMPLE 3

The procedure from Example 1 is repeated, except that the 8.4% (wt) initiator solution is fed to the extruder at a rate of 0.75 lb/hr. Except for the material temperature in the first third of the extruder, temperatures in the extruder and the dryer remain as they are in Example 1. The material temperature in the first third of the extruder is 175°–185° F. The copolymer produced is the desired product.

EXAMPLE 4

The procedure from Example 1 is repeated, except that a monomer blend consisting of 2.6% (wt) N,N-dimethylacrylamide, 48.7% (wt) sodium 2-acrylamido-2-methylpropanesulfonate, and 48.7% (wt) water is fed to the extruder at 80.9 lb/hr. The initiator solution concentration and feed rate are maintained as indicated in Example 1. The material temperatures in the first third, second third, and final third of the extruder are 140°–150° F., 200°–210° F., and 220°–230° F. The material temperature at the extruder die is 250°–260° F. In the dryer, the polymer is dried to a water content of 1–2% (wt). The copolymer produced is the desired product.

EXAMPLE 5

The procedure from Example 1 is repeated, except that a monomer solution consisting of 58% (wt) sodium 2-acrylamido-2-methylpropanesulfonate and 42% (wt) water is fed to the extruder at 70 lb/hr. An initiator solution consisting of 8.4% (wt) ammonium persulfate and 91.6% (wt) water is fed to the extruder at 0.8 lb/hr. The material temperature in the first third, second third, and final third of the extuder are 135°–145° F., 200°–210° F., and 200°–210° F. The material temperature at the extruder die is 200°–210° F. The resulting polymer is dried to a water content of 0–1% (wt). The final dried homopolymer has a weight-average molecular weight of 900,000.

While in accordance with the present invention, a best mode of preferred embodiment has been illustrated in detail, the invention is not limited thereto, but rather by the scope of the attached Claims.

What is claimed is;

1. A method for producing an amido-sulfonic acid or salt containing homopolymer; comprising the steps of;
adding an amido-sulfonic acid or salt containing monomer to a vessel, said amido-sulfonic acid or salt containing monomer having the formula:

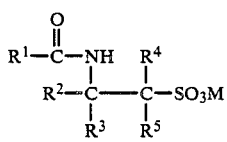

where $R^1$ is a hydrocarbyl having from 1 to about 11 carbon atoms, wherein $R^2$, $R^3$, $R^4$, and $R^5$, independently, is hydrogen or a hydrocarbyl with the proviso that the total number of carbon atoms of $R^2$, $R^3$, $R^4$, and $R^5$ is 8 carbon atoms or less wherein M is H, ammonium, a metal cation or mixtures thereof;
polymerizing said salt amido-sulfonic acid or salt containing monomer in the presence of a high energy mechanical mixing, and
conducting the final stage of said polymerization at a temperature of from about 200° F. to below the degradation temperature of said monomer.

2. A method according to claim 1, wherein $R^1$ is an olefinic group, and wherein $R^2$, $R^3$, $R^4$, and $R^5$, independently, is hydrogen or a lower alkyl having from 1 to about 8 carbon atoms.

3. A method according to claim 2, wherein said monomer is in a solution and wherein the amount of said monomer is from about 15% to about 100% by weight based upon the total weight of said monomer and said solution.

4. A method according to claim 3, including drying said homopolymer before any substantial cooling thereof, wherein said homopolymer after drying contains 20% or less by weight of water therein, and wherein said metal cation is potassium, magnesium, calcium, lithium, zinc, iron, sodium, or mixtures thereof.

5. A method according to claim 4, including producing a solid polymer, wherein said final polymerization stage temperature is from about 220° F. to below the degradation temperature of said monomer, and wherein said drying temperature of said homopolymer is from about 212° F. to about 600° F. or is conducted in a vacuum.

6. A method according to claim 5, wherein said monomer is contained in an aqueous solution, and wherein the amount of said monomer in said aqueous solution is from about 40% to about 70% by weight.

7. A method according to claim 6, wherein $R^1$ is a vinyl group, wherein $R^2$ and $R^3$ is methyl, wherein $R^4$ and $R^5$ is hydrogen, wherein the amount of monomer in said aqueous solution is from about 50% to about the saturation point of said solution, and wherein said homopolymer has 10% or less by weight of water therein and wherein said homopolymer has a weight average molecular weight of from about 500,000 to about 6,000,000.

8. A method according to claim 7, wherein the amount of said monomer in said aqueous solution is from about 55% to about 60% by weight, wherein said final polymerizing stage temperature is from about 240° F. to about 280° F., wherein said homopolymer has 3% or less by weight of water therein, and wherein said metal cation is sodium, potassium, or mixtrues thereof.

9. A method according to claim 3, including carrying out said high energy mechanical mixing in a static mixer or an extruder.

10. A method according to claim 9, wherein said extruder is a twin screw extruder.

11. A method according to claim 6, including carrying out said high energy mechanical mixing in an extruder.

12. A method according to claim 11, wherein said extruder is a twin screw extruder.

13. A method according to claim 8, including carrying out said high energy mechanical mixing in an extruder.

14. A method according to claim 13, wherein said extruder is a twin screw extruder.

15. A method for producing an amido-sulfonic acid or salt containing copolymer; comprising the steps of; adding an amido-sulfonic acid or salt containing monomer and at least 1 copolymerizable comonomer to a reaction vessel, said amido-sulfonic acid or salt containing monomer having the formula

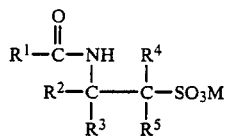

where $R^1$ is a hydrocarbyl having from 1 to about 11 carbon atoms, wherein $R^2$, $R^3$, $R^4$, and $R^5$, independently is hydrogen or a hydrocarbyl with the proviso that the total number of carbon atoms of $R^2$, $R^3$, $R^4$, and $R^5$ is 8 carbon atoms or less, the amount of said copolymerizable comonomer being from about 0.1% to about 30% based upon the total weight of said amido-sulfonic acid or salt containing monomer and said copolymerizable copolymers, wherein M is H, ammonium, a metal cation or mixtures thereof; and polymerizing said amido-sulfonic acid or salt containing monomer and said copolymerizable comonomer in the presence of a high energy mechanical mixer.

16. A method according to claim 15, wherein said amido-sulfonic acid or salt containing monomer and said comonomer are contained in an aqueous solution, wherein the amount of said monomer and said comonomer in said aqueous solution is from about 15% to about 100% by weight based upon the total weight of said monomer, said comonomer and said aqueous solution, wherein the amount of said comonomer is from about 1% to about 15% by weight based upon the total weight of said comonomer and said amido-sulfonic acid or salt containing monomer and wherein the weight average molecular weight of said copolymer is from about 100,000 to about 9,000,000.

17. A method according to claim 16, including conducting the final stage of said polymerization at a temperature of from about 200° F. to below the degradation temperature of said comonomer or said monomer, wherein the said metal cation of of said amido-sulfonic acid or salt containing monomer is selected from the group consisting of sodium, potassium, calcium, zinc, iron, magnesium, lithium, and mistures thereof, and including drying said polymerized copolymer before substantial cooling thereof so that said copolymer has a water content of about 20% or less by weight.

18. A method according to claim 17, wherein said copolymer produced after drying is a solid copolymer.

19. A method according to claim 18, wherein said drying temperature is from about 212° F. to about 600° F. or is conducted in a vacuum, and wherein said final stage polymerization temperature is from about 220° F. to below the degradation temperature of said monomer or said comonomer.

20. A method according to claim 19, wherein said comonomer is water soluble so that said produced copolymer is water soluble.

21. A method according to claim 20, wherein $R^1$ is an olefinic group, wherein $R^2$, $R^3$, $R^4$, and $R^5$, independently, is hydrogen or a lower alkyl having from 1 to about 8 carbon atoms, and wherein said comonomer is selected from the group consisting of the various acrylamides, the various vinyl pyrrolidones, the various caprolactams, the various acrylates, the various acrylonitriles, the various acrylic acids and salts thereof, the various maleic acids and salts thereof, the various maleic anhydrides, and combinations thereof, and wherein said metal cation sodium, potassium, or mixtures thereof.

22. A method according to claim 21, wherein the amount of said monomer and said comonomer is from about 40% by weight to about the saturation point of said aqueous solution, wherein said final stage polymerization temperature is from about 230° F. to about 300° F., wherein the amount of said comonomer is from about 3% to about 8% by weight based upon the total weight of said monomer, and said comonoer, and wherein the amount of water in said solid polymer is about 10% or less by weight.

23. A method according to claim 22, wherein the total amount of said comonomer in said aqueous solution is about 50% to 60% by weight, and wherein the weight average molecular weight of said produced copolymer is from about 500,000 to about 6,000,000.

24. A method according to claim 23, wherein $R^1$ is a vinyl group, wherein $R^2$ and $R^3$ are methyl, wherein $R^4$ and $R^5$ are hydrogen, and wherein said comonomer is selected from the group consisting of N-vinylpyrrolidone, N,N-dimethylacrylamide, diacetoneacrylamide, acrylamide, N-vinylcaprolactam, t-butyacrylamide, and mixtures thereof.

25. A method according to claim 24, wherein the total amount of said comonomer in said aqueous solution is from about 55 to about 60% by weight, wherein said final stage polymerization temperature is from about 240° to about 280° F., wherein said comonomer is N,N-dimethylacrylamide, and wherein the amount of water in said solid polymer is 3% or less by weight.

26. A method according to claim 20, wherein said high energy mechanical mixing occurs in an extruder, in two roll mill, or a static mixer.

27. A method according to claim 25, wherein said high energy mechanical mixing occurs in an extruder, in two roll mill, or a static mixer.

28. A method according to claim 25, wherein said high energy mechanical mixing occurs in a twin screw extruder.

29. A method according to claim 15, including adding from 0.1 to about 1.0 parts by weight of a catalyst system per 100 parts by weight of said monomers.

30. A method according to claim 23, including adding from 0.1 to about 1.0 parts by weight of a catalyst system per 100 parts by weight of said monomers.

31. A method according to claim 30, wherein said catalyst system includes a cocatalyst and wherein said cocatalyst and including adding said cocatalysts only initially to said polymerization reaction.

* * * * *

REEXAMINATION CERTIFICATE (1517th)

United States Patent [19]

Sopko et al.

[11] B1 4,812,544

[45] Certificate Issued     Jul. 23, 1991

[54] METHOD OF PRODUCING POLYMERS OF AMIDO-SULFONIC ACID MONOMERS WITH HIGH ENERGY AGITATORS

[75] Inventors: Thomas M. Sopko, Painesville; Richard E. Lorenz, Euclid, both of Ohio

[73] Assignee: The Lubrizol Corporation, Wickliffe, Ohio

Reexamination Request:
No. 90/001,989, Apr. 9, 1990

Reexamination Certificate for:
Patent No.: 4,812,544
Issued: Mar. 14, 1989
Appl. No.: 774,269
Filed: Sep. 10, 1985

[51] Int. Cl.$^5$ .................... C08F 2/00; C08F 28/02
[52] U.S. Cl. ........................ 526/73; 526/88; 526/287; 264/331.11
[58] Field of Search ............... 526/73, 88, 287

[56] References Cited

U.S. PATENT DOCUMENTS

| | | | |
|---|---|---|---|
| 3,332,904 | 7/1967 | La Combe et al. | 260/33.2 |
| 3,478,091 | 11/1969 | Murfin et al. | 260/513 |
| 3,503,941 | 3/1970 | Fleetwood | 260/80 |
| 3,547,899 | 12/1970 | Arit et al. | 260/793 |
| 3,663,518 | 5/1972 | Patzelt et al. | 260/80.3 N |
| 3,666,810 | 5/1972 | Hoke | 260/561 N |
| 3,679,000 | 7/1972 | Kaufman | 166/273 |
| 3,681,308 | 8/1972 | Irvin et al. | 260/80.78 |
| 3,685,804 | 8/1972 | Stansfield | 259/10 |
| 3,692,673 | 9/1972 | Hoke | 210/52 |
| 3,732,193 | 5/1973 | Swarz | 260/79.3 |
| 3,768,565 | 10/1973 | Persinski et al. | 166/308 |
| 3,898,037 | 8/1975 | Lange et al. | 21/2.7 R |
| 3,931,089 | 1/1976 | Karl | 260/29.65 |
| 4,008,293 | 2/1977 | Maska et al. | 260/856 |
| 4,032,701 | 6/1977 | Hughes | 526/88 |
| 4,034,001 | 7/1977 | Miller et al. | 260/513 N |
| 4,110,521 | 8/1978 | Barnett et al. | 526/64 |
| 4,138,539 | 2/1979 | Landolt et al. | 526/93 |
| 4,208,329 | 6/1980 | Smiley | 548/239 |
| 4,209,599 | 6/1980 | Brady et al. | 526/64 |
| 4,243,784 | 1/1981 | Akima et al. | 526/88 |
| 4,283,517 | 8/1981 | Perricone et al. | 536/229 |
| 4,293,427 | 10/1981 | Lucas et al. | 252/8.5 C |
| 4,296,016 | 10/1981 | Randin | 260/29.6 |
| 4,309,329 | 1/1982 | Lucas et al. | 260/29.6 TA |
| 4,383,093 | 5/1983 | Shiraki et al. | 526/64 |
| 4,404,111 | 9/1983 | Bi et al. | 252/8.55 D |
| 4,487,897 | 12/1984 | Matsuoka et al. | 526/64 |
| 4,530,979 | 7/1985 | Birch | 526/64 |
| 4,547,299 | 10/1985 | Lucas | 252/8.5 C |
| 4,554,307 | 11/1985 | Farrar et al. | 524/425 |
| 4,612,355 | 9/1986 | Belz | 526/65 |
| 4,622,373 | 11/1986 | Bardoliwalla | 526/240 |
| 4,652,623 | 3/1987 | Chem et al. | 526/287 |
| 4,655,942 | 4/1987 | Dickert, Jr. et al. | 252/8.5 |
| 4,737,541 | 4/1988 | Stavenger et al. | 524/547 |
| 4,741,843 | 5/1988 | Garvey et al. | 252/8.514 |
| 4,743,383 | 5/1988 | Stewart et al. | 252/8.51 |
| 4,743,666 | 5/1988 | Engelhardt et al. | 526/240 |
| 4,746,687 | 5/1988 | Ryles et al. | 523/130 |
| 4,770,796 | 9/1988 | Jacobs | 252/8.553 |
| 4,785,028 | 11/1988 | Hoskin et al. | 523/130 |

FOREIGN PATENT DOCUMENTS 777306   9/1955   United Kingdom .

OTHER PUBLICATIONS

Mack, "Bulk Polymerization in Screw-Conveyor Reactors", Chemical Engineering, May 15, 1972, pp. 99-102.

Werner & Pfleiderer, Product Literature for "Twin-Screw Reactors Type 2DS-Re".

Matsuda, "Acylamide Production Simplified," Chemtech, May 1977, pp. 306-308.

Pohl et al., "Adiabatic Polymerization of Acrylamide Using a Persulfate-Bisulfite Redox Couple," Journal of Applied Polymer Science, vol. 26, 611-618 (1980).

The Lubrizol Corporation, Product Literature for AMPS TM Monomer, 1981.

*Primary Examiner*—Edward J. Smith

[57]     ABSTRACT

A method for producing homopolymers and copolymers from amido-sulfonic acid or salt containing monomers in the presence of high energy mechanical mixing utilizing a final stage polymerization temperature of from about 200° F. to below the degradation temperature of the monomer. The process produces a solid homopolymer or copolymer which can be utilized as fluid loss agents.

REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

The patentablility of claims 1-14 is confirmed.

Claim 15 is determined to be patentable as amended.

Claims 16-31, dependent on an amended claim, are determined to be patentable.

New claims 32-104 are added and determined to be patentable.

15. A method for producing an amido-sulfonic acid or salt containing copolymer; comprising the steps of:
adding an amido-sulfonic acid or salt containing monomer and at least 1 copolymerizable comonomer to a reaction vessel, said amido-sulfonic acid or salt containing monomer having for formula

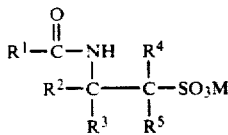

where $R^1$ is a hydrocarbyl having from 1 to about 11 carbon atoms, wherein $R^2$, $R^3$, $R^4$ and $R^5$, independently is hydrogen or a hydrocarbyl with the proviso that the total number of carbon atoms of $R^2$, $R^3$, $R^4$ and $R^5$ is 8 carbon atoms or less, the amount of said copolymerizable comonomer being from about 0.1% to about 30% based upon the total weight or said amido-sulfonic acid or salt containing monomer and said copolymerizable copolymers, wherein M is H, ammonium, a metal cation or mixtures thereof; and
polymerizing said amido-sulfonic acid or salt containing monomer and said copolymerizable comonomer in the presence of [a] *high energy mechanical* [mixer] *mixing, the final stage of said polymerizing step being conducted at a temperature of from about 200° F. to below the degradation temperature of said monomer or said comonomer.*

32. *The method of claim 1 wherein $R^1$ is an olefinic group.*

33. *The method of claim 1 wherein $R^1$ is a vinyl group.*

34. *The method of claim 1 wherein $R^2$, $R^3$, $R^4$ and $R^5$ are, independently, hydrogen or alkyl groups of 1 to about 8 carbon atoms.*

35. *The method of claim 1 wherein M is selected from the group consisting of potassium, magnesium, calcium, lithium, iron, zinc, sodium or a mixture of two or more thereof.*

36. *The method of claim 1 wherein said monomer is 2-acrylamido-2-methylpropane sulfonic acid or a salt thereof.*

37. *The method of claim 1 wherein said polymerizing step is conducted in a two-roll mill, extruder, continuous mixer or static mixer.*

38. *The method of claim 1 wherein said polymerizing step is conducted in an extruder.*

39. *The method of claim 1 wherein said polymerizing step is conducted in a twin-screw extruder.*

40. *The method of claim 1 wherein said polymerizing step is conducted in a continuous mixer.*

41. *The method of claim 1 wherein said polmyerizing step is conducted in an extruder having three heating zones, the first zone operating at a temperature in the range of about 90° F. to about 180° F., the second zone operating at a temperature in the range of about 150° F. to about 240° F., the third zone operating at a temperature in the range of about 200° F. to about 300° F.*

42. *The method of claim 1 wherein the final stage of said polymerizing step is conducted at a temperature in the range of about 220° F. to slightly below the degradation temperature of said monomer.*

43. *The method of claim 1 wherein the final stage of said polymerizing step is conducted at a temperature in the range of about 230° F. to about 300° F.*

44. *The method of claim 1 wherein the final stage of said polymerizing step is conducted at a temperature in the range of about 240° F. to about 280° F.*

45. *The method of claim 1 wherein said polymer is substantially dried before any substantial reduction in temperature of said polymer occurs.*

46. *The method of claim 1 wherein said polymer is dried, said polymer being maintained at a temperature of at least about 200° F. prior to being dried.*

47. *The method of claim 1 wherein said polymer is dried in a vacuum.*

48. *The method of claim 1 wherein said polymer is dried at a temperature in the range of about 212° F. to about 600° F.*

49. *The method of claim 1 wherein said polymer is dried at a temperature in the range of about 350° F. to about 550° F.*

50. *The method of claim 1 wherein said polymer is dried at a temperature in the range of about 400° F. to about 500° F.*

51. *The method of claim 1 wherein said polymer is dried sufficiently so that the amount of solvent remaining in said polymer is less than about 20% by weight.*

52. *The method of claim 1 wherein the polymerization of said monomer is conducted in the presence of at least one initiator.*

53. *The method of claim 1 wherein the polymerization of said monomer is conducted in the presence of a co-catalyst, said co-catalyst being added at the beginning of the polymerization reaction.*

54. *The method of claim 1 wherein the polymerization of said monomer is conducted in the presence of sodium meta-bisulfite, said sodium meta-bisulfite being added at the beginning of the polymerization reaction.*

55. *The method of claim 1 wherein said polymer has a weight average molecular weight in the range of about 100,000 to about 9,000,000.*

56. *The method of claim 1 wherein $R^1$ is an aliphatic group having from 1 to about 4 carbon atoms.*

57. *The method of claim 1 wherein said monomer is dissolved in a solvent.*

58. The method of claim 1 wherein said monomer is dissolved in water.

59. The method of claim 1 wherein said monomer is dissolved in dimethylformamide, methanol or dimethylsulfoxide.

60. The method of claim 1 wherein said monomer is dissolved in a solvent, the concentration of said monomer in said solvent being less than the saturation weight of amount of said monomer in said solvent.

61. The method of claim 1 wherein said monomer is dissolved in a solvent, the concentration of said monomer in said solvent ranging from about 40% to about 70% by weight based on the combined weight of said monomer and said solvent.

62. The method of claim 1 wherein said monomer is dissolved in a solvent, and said polymer is dried at a temperature in the range of the boiling point of said solvent up to about 600° F.

63. The method of claim 1 wherein the polymerization of said monomer is conducted in an aqueous sytem in the presence of a peroxide, persulfate, persulfate-sulfite or redox system.

64. The method of claim 1 wherein the polymerization of said monomer is conducted in an aqueous system in the presence of ammonium persulfate.

65. The method of claim 1 wherein said polymer is dried and ground into a powder.

66. The method of claim 15 wherein $R^1$ is an olefinic group.

67. The method of claim 15 wherein $R^1$ is a vinyl group.

68. The method of claim 15 wherein $R^2$, $R^3$, $R^4$ and $R^5$ are, independently, hydrogen or alkyl groups of 1 to about 8 carbon atoms.

69. The method of claim 15 wherein M is selected from the group consisting of potassium, magnesium, calcium, lithium, iron, zinc, sodium or a mixture of two or more thereof.

70. The method of claim 15 wherein said monomer is 2-acrylamido-2-methylpropane sulfonic acid or a salt thereof.

71. The method of claim 15 wherein said comonomer is at least one acrylamide, vinyl pyrrolidone, vinyl caprolactam, acrylate, acrylonitrile, acrylic acid, maleic acid, maleic anhydride, or salt thereof.

72. The method of claim 15 wherein said comonomer is methacrylamide, N,N-dimethylacrylamide, diacetoneacrylamide, dimethylaminopropylmethacrylamide, t-butylacrylamide, acrylamide or a mixture of two or more thereof.

73. The method of claim 15 wherein said comonomer is N-vinylpyrrolidone, N-vinylcaprolactam, or a mixture thereof.

74. The method of claim 15 wherein said comonomer is t-butylacrylate, methylacrylate, dihydrodicylopentadienyl acrylate, 4-butane diol monoacrylate, diethylaminoethylacrylate, methylmethacrylate, acrylonitrile, chloroacrylonitrile, methacrylonitrile, or a mixture of two or more thereof.

75. The method of claim 15 wherein said comonomer is N,N-dimethylacrylamide.

76. The method of claim 15 wherein said polymerizing step is conducted in a continuous mixer.

77. The method of claim 15 wherein said polymerizing step is conducted in an extruder.

78. The method of claim 15 wherein said polymerizing step is conducted in a twin-screw extruder.

79. The method of claim 15 wherein said polymerizing step is conducted in an extruder having three heating zones, the first zone operating at a temperature in the range of about 90° F. to about 180° F., the second zone operating at a temperature in the range of about 150° F. to about 240° F., the third zone operating at a temperature in the range of about 200° F. to about 300° F.

80. The method of claim 15 wherein the final stage of said polymerizing step is conducted at a temperature in the range of about 220° F. to slightly below the degradation temperature of said monomer or said comonomer.

81. The method of claim 15 wherein the final stage of said polymerizing step is conducted at a temperature in the range of about 230° F. to about 300° F.

82. The method of claim 15 wherein said copolymer is substantially dried before any substantial reduction in temperature of said copolymer occurs.

83. The method of claim 15 wherein said copolymer is substantially dried, said copolymer being maintained at a temperature of at least about 200° F. prior to being dried.

84. The method of claim 15 wherein said copolymer is dried in a vacuum.

85. The method of claim 15 wherein said copolymer is dried at a temperature in the range of about 212° F. to about 600° F.

86. The method of claim 15 wherein said copolymer is dried at a temperature in the range of about 350° F. to about 550° F.

87. The method of claim 15 wherein said copolymer is dried sufficiently so that the amount of solvent remaining in said copolymer is less than about 20% by weight.

88. The method of claim 15 wherein the polymerization of said monomer and comonomer is conducted in the presence of at least one initiator.

89. The method of claim 15 wherein the polymerization of said monomer and comonomer is conducted in the presence of a co-catalyst said co-catalyst being added at the beginning of the polymerization reaction.

90. The method of claim 15 wherein the polymerization of said monomer and comonomer is conducted in the presence of sodium meta-bisulfite, said sodium meta-bisulfite being added at the beginning of the polymerization reaction.

91. The method of claim 15 wherein said copolymer has a weight average molecular weight in the range of about 100,000 to about 9,000,000.

92. A method of producing a homopolymer of 2-acrylamido-2-methyl propane sulfonic acid or salt thereof comprising:

(i) adding 2-acrylamido-2-methyl propane sulfonic acid or salt thereof to a self-wiping continuous mixer or extruder; and (ii) polymerizing said monomer in said mixer or extruder using high energy mechanical mixing, the final stage of step (ii) being conducted at a temperature in the range of about 200 F. to below the degradation temperature of said monomer.

93. The method of claim 15 wherein $R^1$ is an aliphatic group having from 1 to about 4 carbon atoms.

94. The method of claim 15 wherein said comonomer contains a vinyl group and a nitrogen and/or oxygen atom.

95. The method of claim 15 wherein said monomer and said comonomer are dissolved in a solvent.

96. The method of claim 15 wherein said monomer and said comonomer are dissolved in water.

97. The method of claim 15 wherein said monomer and said comonomer are dissolved in dimethylformamide, methanol or dimethylsulfoxide.

98. The method of claim 15, wherein said monomer and said comonomer are dissolved in a solvent, the combined concentration of said monomer and comonomer in said solvent being less than the saturation weight of amount of said monomer and comonomer in said solvent.

99. The method of claim 15 wherein said monomer and said comonomer are dissolved in a solvent, the combined concentration of said monomer and comonomer in said solvent ranging from about 40% to about 70% by weight based on the combined weight of said monomer, comonomer and solvent.

100. The method of claim 15 wherein said monomer and comonomer are dissolved in a solvent, and said copolymer is dried at a temperature in the range of the boiling point of said solvent up to about 600° F.

101. The method of claim 15 wherein the polymerization of said monomer and comonomer is conducted in an aqueous system in the presence of a peroxide, persulfate, persulfate-sulfite or redox system.

102. The method of claim 15 wherein the polymerization of said monomer and comonomer is conducted in an aqueous system in the presence of ammonium persulfate.

103. The method of claim 15 wherein said copolymer is dried and ground into a powder.

104. A method for producing a copolymer of 2-acrylamido-2-methyl propane sulfonic acid or salt thereof and at least one copolymerizable comonomer, said method comprising:

(i) adding at least one monomer of 2-acrylamido-2-methyl propane sulfonic acid or salt thereof and at least one copolymerizable comonomer to a self-wiping continuous mixer or extruder; and (ii) polymerizing said monomer and comonomer in said mixer or extruder using high energy mechanical mixing, the final stage of step (ii) being conducted at a temperature in the range of about 200° F. to below the degradation temperature of said monomer or said comonomer.

* * * * *